Aug. 28, 1951 J. AICARDI 2,566,154

RADIO GUIDANCE SYSTEM

Filed Sept. 19, 1945 4 Sheets-Sheet 1

INVENTOR

JOSEPH AICARDI, by Richard S. Ould

ATTORNEY

Aug. 28, 1951 J. AICARDI 2,566,154

RADIO GUIDANCE SYSTEM

Filed Sept. 19, 1945 4 Sheets-Sheet 2

INVENTOR

JOSEPH AICARDI,

By Richard S. Ould

ATTORNEY

Aug. 28, 1951 J. AICARDI 2,566,154

RADIO GUIDANCE SYSTEM

Filed Sept. 19, 1945 4 Sheets-Sheet 3

INVENTOR
JOSEPH AICARDI,
By Richard S. Ould
ATTORNEY

INVENTOR
JOSEPH AICARDI
by Richard S. O'Neil
ATTORNEY

Patented Aug. 28, 1951

2,566,154

UNITED STATES PATENT OFFICE 2,566,154

RADIO GUIDANCE SYSTEM

Joseph Aicardi, Versailles, France, assignor to Sadir-Carpentier, Paris, France, a joint-stock company of France Application September 19, 1945, Serial No. 617,259
In France December 20, 1943

Section 1, Public Law 690, August 8, 1946
Patent expires December 20, 1963

9 Claims. (Cl. 343—107)

This invention relates to a radio guidance system in which a swinging axis is provided which serves for beaconing purposes and is defined at the receiving station which may be on a mobile craft by the fact that said receiving station supplies after detection a current the magnitude of which passes through a minimum which can be zero.

According to the present invention, the magnitude of the current detected at the receiver, varies with the azimuth of the line which connects the transmitter station with the receiver. This variation is obtained as follows: the transmitter radiates two fields of the same high frequency, one of which H1 is completely modulated with suppression of the carrier wave, while the other H2 is partially modulated. Both said fields are modulated at the same low frequency but the phase of their modulation for transmission in a given direction varies with the azimuth of that direction in the case of the field H1, and remains fixed in the case of the field H2, this fixed value being, moreover, adjustable at will. Thus, the resulting field in reception has a variable modulation rate which varies with the azimuth of the receiver and reaches a maximum in the directions where the low frequency modulations of the two fields are in phase, and reaches a minimum in the directions where they are in phase opposition. Since the magnitude of the carrier wave does not depend on the azimuth, the detected current varies as the modulation rate.

According to a form of execution of the present invention, the determination of the value of this minimum is made by the familiar method of intermixed signals, i. e. by causing the value of the modulation phase of one of the two fields H1 and H2 produced by the transmitter, preferably H2, to vary at the cadence of these intermixed signals.

The variation of the modulation phase of the field H1 as a function of the azimuth, is obtained in transmission by means of a combination of two fixed coil aerials located in perpendicular planes, fed in phase with a high frequency current and modulated by two low frequency voltages of the same frequency but in quadrature. The field H2 is radiated by an aerial located in the common centre of both frames. Each of said frames can, of course, be replaced by a system of two fixed aerials or antennae fed in phase opposition.

Thus, the invention provides a radio guidance system involving, beside the transmission proper, only low or very low frequency currents, as distinguished from those systems in which high frequency phase shifts are employed and it is well known that it is much easier to act upon low frequency than upon high frequency in this manner. This is an important advantage of the system according to the invention which results in improved stability and simplicity of the adjusting operations and the like.

Radio guidance systems making it possible to obtain the above mentioned results show the characteristic features which will appear from the following description and more particularly from the appended claims.

The invention will be explained more particularly with reference to the appended drawings in which preferred forms of execution of the invention are shown by way of non-limitative examples. In said drawings.

Figure 3A:
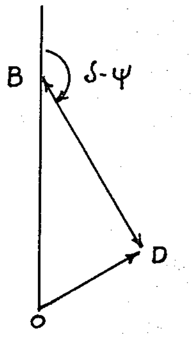
Figure 3B:
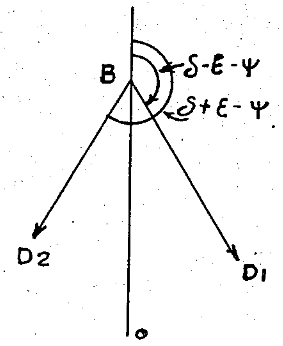

Figures 3*a* and 3*b* show the diagrams of the modulation currents obtained in the receiver station.

Figure 4:
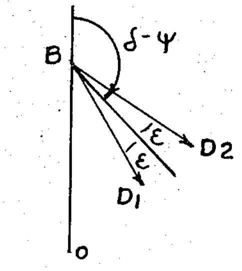

Figure 4 shows the diagram of the currents in a first modification.

Figures 5, 6:
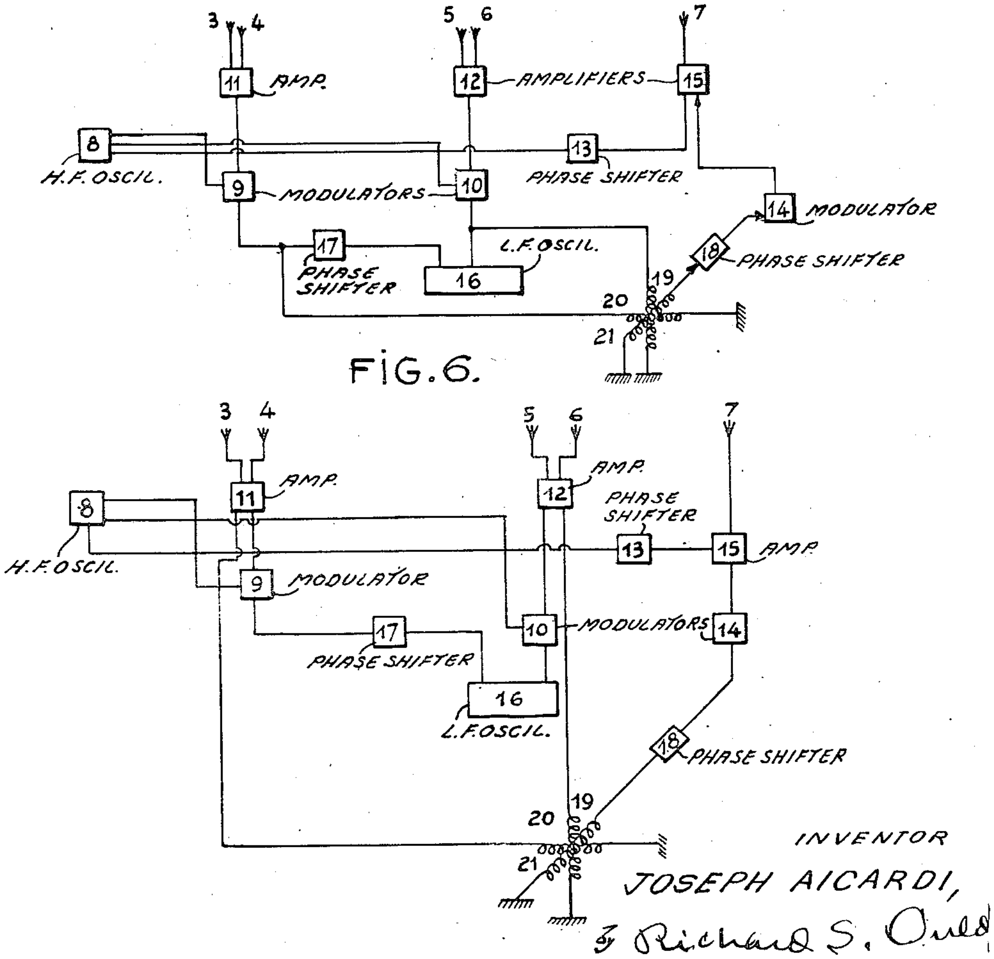

Figure 5 shows a diagram of the transmitter.

Figure 6 shows a modified form of transmitter.

Figure 7:
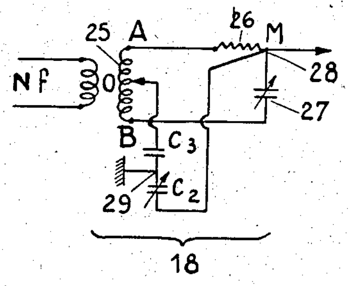

Figure 7 shows the phase shifter of a radio guidance equipment according to one of the preceding figures.

Figure 8:
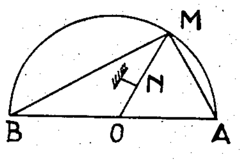

Figure 8 shows the diagram of the voltages across the phase shifter of Figure 7.

Figure 9:
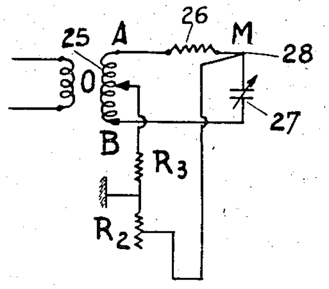

Figure 9 shows another embodiment of the phase shifter.

Figure 10:
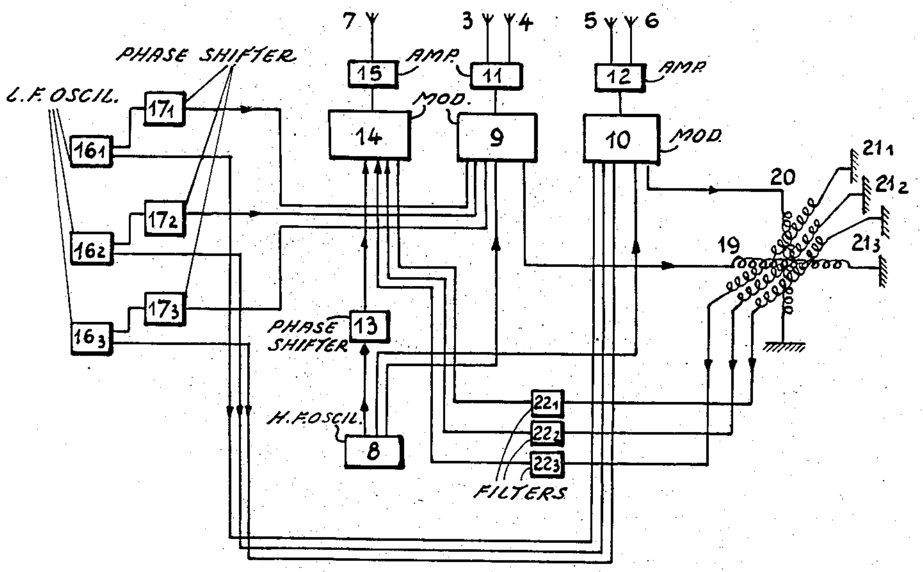

Figure 10 shows a radio guidance system with a plurality of beaconing axes.

Figure 11:
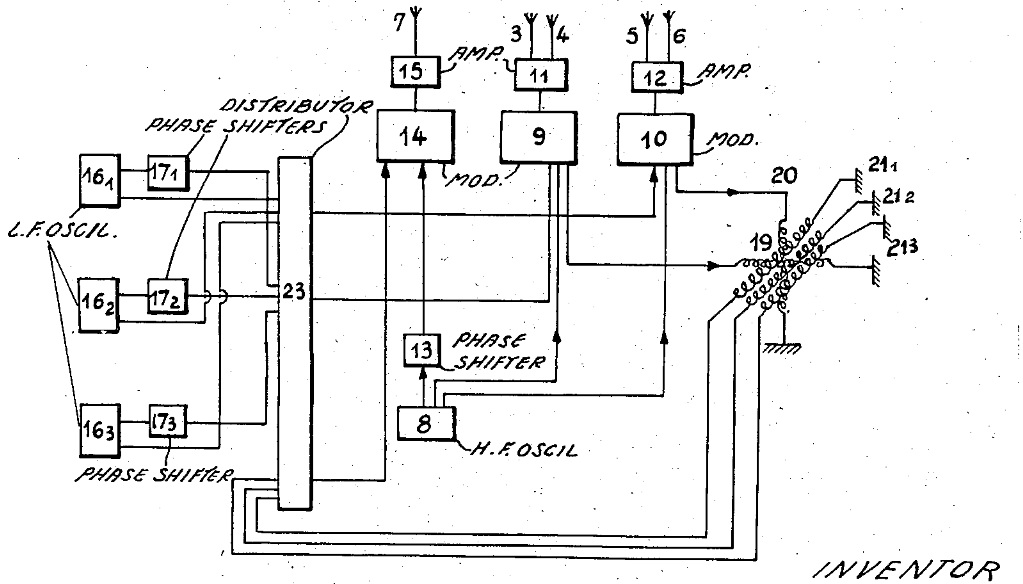

Figure 11 shows another radio guidance system with a plurality of beaconing axes.

Figures 12, 13:
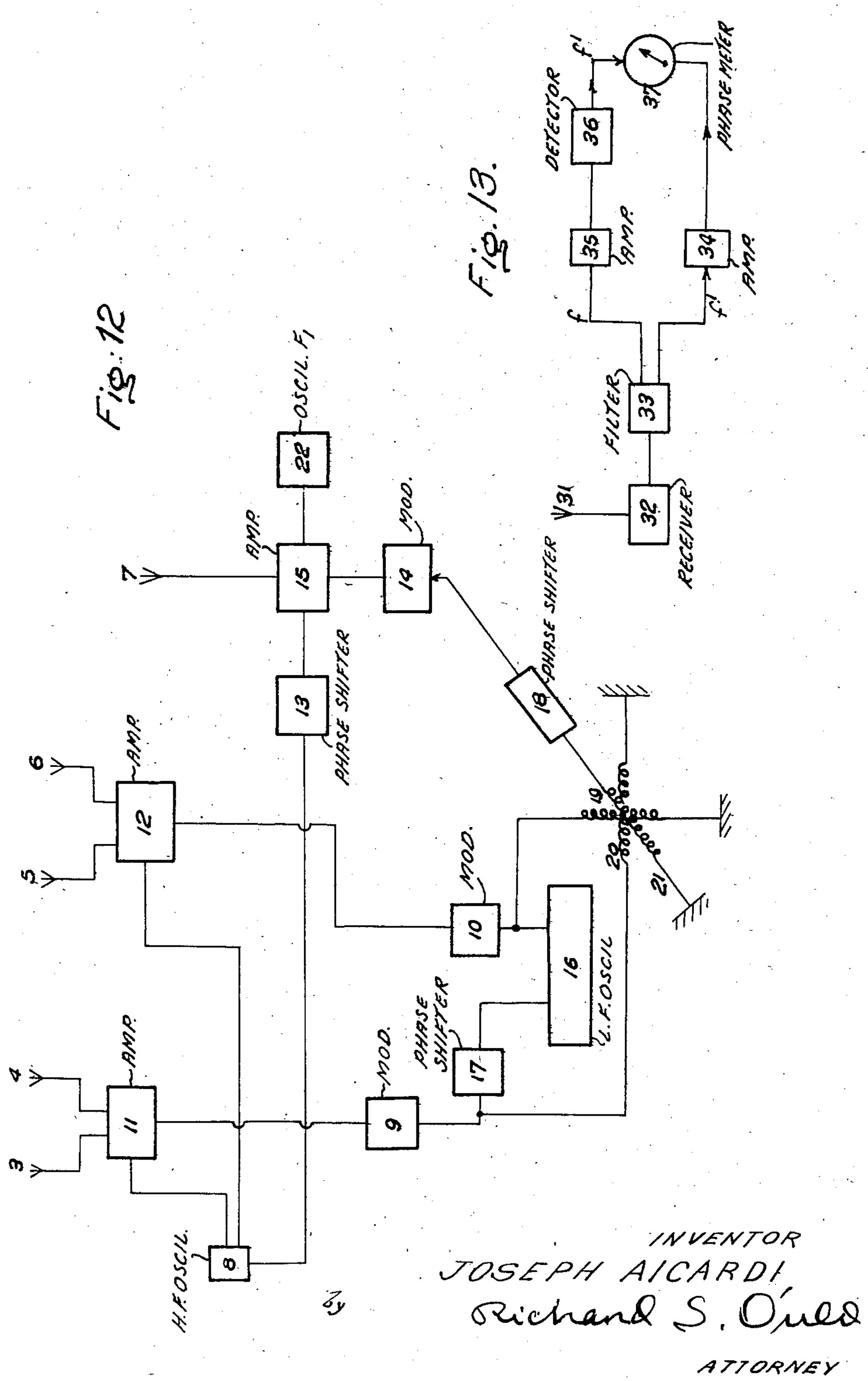

Figure 12 shows a radio guidance system which permits a direct reading of the bearing of the receiver, and Figure 13 shows the receiver device used in combination with the radio guidance system of Figure 12.

Figure 1:
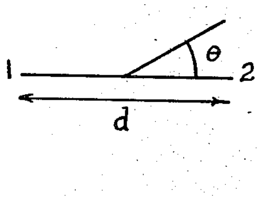
Figure 1 is a view showing the operation of two antennae forming a frame.

The radiating properties of a system of two antennae fed with high frequency and in phase opposition may be considered with reference to Fig. 1 in which are shown two antennae 1 and 2 through which pass the following currents:

$$a \sin \alpha t \cdot \sin \omega t$$

and $$-a \sin \alpha t \cdot \sin t$$

The low frequency modulation currents (pulsation $\alpha t$) are in phase, and the high frequency currents being of pulsation $\omega$, are modulated with elimination of the carrier wave. If $\lambda$ is the emitted wave length and $d$ the spacing of both antennae, the resulting field in a given direction making the angle $\theta$ with the antenna line 1—2 has the value:

$$b \sin \alpha t \cdot \cos \omega t \cdot \sin \varphi \quad (1)$$

the angle $\varphi$ being given by the known relation:

$$\varphi = \frac{\pi}{\lambda} d \cdot \cos \theta \quad (2)$$

the total propagation time of the wave being neglected, which is of little importance, since said time is the same in the various following considerations.

It is well known that the result (1) is obtained by considering the time differences in the travel of the waves, issuing from the antennae 1 and 2 respectively, for reaching the receiver station. It is, in short, the explanation of the directional properties of a system of two antennae the action of which is equivalent, as it is well known, to that of a loop. It is to be noted that the high frequency field received would be in quadrature with the currents flowing through the antennae except for the propagation time.

Figure 2:
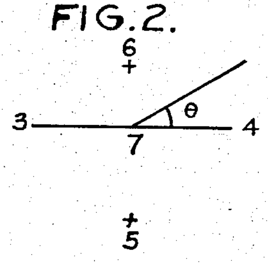
Figure 2 shows the system of five antennae of the transmitter station according to the invention.

As already indicated the transmitter station according to the present invention comprises two systems of two fixed antennae with a common centre and the same spacing 3—4 and 5—6 (Figure 2) and an antenna 7 arranged in the centre. Antenna systems 3—4 and 5—6 are used preferably instead of loops, but, of course, loops could be used as well. The antennae 3—4 are fed by currents $$a \sin \alpha t \sin \omega t$$

and $$-a \sin \alpha t \sin \omega t$$

and the antennae 5—6 are fed with currents of the same high frequency with the same phase but the modulation of which, for the same pulsation $\alpha$, is in quadrature with the preceding one, i. e. currents of the form:

$$a \cos \alpha t \sin \omega t$$

and $$-a \cos \alpha t \sin \omega t$$

One may easily see that in the direction disposed at the angle $\theta$ with the line 3—4 the field due to the system 3—4 has the value $$b \sin \varphi \sin \alpha t \cdot \cos \omega t$$

and that due to the system 5—6 the value $$-b \sin \varphi' \cos \alpha t \cdot \cos \omega t$$

with $$\varphi' = \frac{\pi d}{\lambda} \sin \theta$$

If $$\frac{d}{\lambda}$$

is small enough to make it possible to equalize $\varphi$ and $\sin \varphi$ on the one hand and $\varphi'$ and $\sin \varphi'$ on the other hand, the sum of both fields becomes:

$$e \cdot \sin (\alpha t - \theta) \cos \omega t$$

Thus, one has a field the maximum magnitude of which is independent of the azimuth $\theta$, the phase of its modulation being equal to the azimuth of the direction under consideration.

If $$\frac{d}{\lambda}$$

has a value such that it is no longer possible to equalize the sines with their angles the above given result is only approximate and the resulting field takes the form:

$$g \sin (\alpha t - \psi) \cos \omega t \quad (3)$$

where $\psi$ is a function of $\theta$, variable with the spacing of the antennae and where $g$ is not entirely independent of the azimuth. But this fact does not substantially change the properties of the above described systems and the resulting advantages as will be seen. The total field of the receiver is obtained by adding to the field (3) given above, the field due to the central antenna the value of which is:

$$f[1 + k \sin (\alpha t - \delta)] \cos \omega t$$

so that after detection a low frequency current of the form:

$$g \sin (\alpha t - \psi) + kf \sin (\alpha t - \delta) \quad (4)$$

is obtained.

One easily sees that the magnitude of this current is a function of relative dephasing $\psi - \delta$ and, accordingly, of $\theta$ on which the angle $\psi$ depends, as already seen. For $g = kf$ the resulting modulation rate is zero for $\psi - \delta = \pi$. If $g \neq kf$ it is only a minimum for this value, whence the desired result.

If $\delta$ is varied at the cadence of intermixed signals from the value $\delta - \epsilon$ to the value $\delta + \epsilon$ the modulation rate retains the same absolute value as easily seen in the case when $$\psi = \delta \text{ or } \delta = \pi + \psi$$

that is to say when the mean phase shift $\delta$ corresponds to the minimum or to the maximum of the modulation rate.

Figure 3*a* shows how the composing modulations are combined for giving the resulting modulation rate. Figure 3*b* shows this combination in the case when the phase shift takes both successive values $\delta - \epsilon$ and $\delta + \epsilon$, the resulting modulation rate having the same absolute value in each case. Thus, to a given value of $\delta$ corresponds a direction $\theta$, that is to say a value of $\psi$ for which one has a minimum for the modulation rate—or a zero for said rate—or still the reception of a continuous signal (equality of the intermixed signals).

Thus, the system defines an axis which can be displaced at will by giving $\delta$ different values. The transmitter according to the invention can be used in different manners as indicated below for defining a fixed or rotary axis.

(*a*) One chooses a pulsation $\alpha$ yielding an audible frequency as, for instance, 1,200 c./sec. and one varies $\delta$ at the cadence of intermixed signals (for instance dot-dash), $\delta$ taking thus the values $\delta - \epsilon$ and then $\delta + \epsilon$. It is obvious that in this manner in a telephone placed at the outlet of the receiver detector currents are collected which are respectively proportional to OD1 and OD2 (Figure 4); said currents are, therefore, as it is found immediately, of unequal magnitude except in the direction for which the vector due to the loop $OB = g$ lies on the bisecting line of the vectors BD1 and BD2 (due to the central antenna), said vectors obviously making the angle $2\epsilon$ (Figure 3*b*) between them.

Accordingly, the receiver works exactly as in the reception of ordinary intermixed signals: on one side of the axis defined by the value of $\delta$ for which OB lies on the bisecting line of $$\overline{D1\ B\ D2}$$

a signal type (the dashes, for instance) is heard louder, on the other side it is the complementary signal (the dots, for instance) and on the axis an even continuous sound is heard.

Figure 5 gives the diagrammatical execution of the transmitter through which this modification is carried out.

The oscillator 8 supplies the systems 3—4 and 5—6 through the medium of the power stages 11 and 12 modulated by the modulators 9 and 10 respectively. The same oscillator also supplies the central antenna 7 through the medium of a phase shifter 13 (introducing a difference of phase of $$\left.\frac{\pi}{2}\right)$$

and of the power stage 15 modulated by the modulator 14.

The modulators 9, 10 and 14 are fed by the low frequency oscillator 16, viz.: the modualtor 10 directly, the modulator 9 through a phase shifter 17 introducing a difference of phase of $$\frac{\pi}{2}$$

and the modulator 14 through a phase shifter 18 introducing an adjustable difference of phase which can be brought periodically through a suitable change over switch from the value $\delta+\epsilon$ to the value $\delta-\epsilon$, and this at the desired cadence of the intermixed signals.

The receiver which is used is of any type used in the receiving methods for the reception of intermixed signals. The various devices which have been described separately are well known by themselves and thus require no other explanations.

It is to be noted that the adjustment of the direction of the axis is obtained by a simple change of the value $\delta$ fixed by the phase shifter 18, which gives a very great facility for this adjustment.

An interesting particular case consists, of course, in taking $2\epsilon=\pi$, i. e. in reversing the phase of the modulation current for the central antenna at the cadence of the intermixed signals.

As already indicated, it is advantageous in certain cases to provide in the transmission such an antenna modulation rate that the coefficients $g$ and $kf$ of Formula 4 are equal. In fact, it results therefrom that $OB=BD$ and, accordingly, by giving the receiving station a certain direction with respect to the transmitter a single type of intermixed signals is heard while the other is exactly annihilated by compensation.

In said modification the spacing of the antennae 3—4 and 5—6, if it is not negligible with respect to the wave length, entails as its only consequence that the phase shift of the modulation is not equal to $\theta$ which, of course, is without any practical importance.

(b) The above defined axis can be rendered rotary by a simple variation of $\delta$ as a function of the time; this variation is preferably chosen so that the axis rotates with a constant speed as, for instance, one revolution in a minute. For this purpose the diagram of Figure 5 can be used by the introduction of two fixed rectangular coils 19 and 20 fed by currents issuing from the low frequency oscillator 16 and phase shifter 17 respectively, that is currents of a pulsation $\alpha$ and in quadrature so as to provide a rotary field of a pulsation $\alpha$. Inside said coils a third coil 21 is caused to rotate with the speed at which it is desired that the beaconed axis rotates and it is this third coil which supplies the modulator 14.

With this arrangement it is possible to remedy the influence of the spacing of the antennae if it is not negligible with respect to the wave length, by causing the central coil to rotate with a predetermined non-constant speed so as to obtain a regular rotation of the axis; it is then a question of providing a correcting cam which can be solved easily. However, it is easier to cause said central coil to rotate with a constant speed and to make the desired correction in order to obtain a regular rotation of the axis by using a phase shifter 18 one of the elements of which, that fixes the magnitude of the dephasing, is a capacity as shown in Figs. 7 and 9 and by giving the condenser forming said capacity the form of a variable condenser the rotor of which is keyed on the axis of the central coil, the blades of said condenser having, of course, a suitable profile.

For the antenna spacings which are used in practice the error due to the spacing comprises a harmonic of the predominant order three; one can then merely use a variable condenser yielding a balancing capacity, rotating at a speed four times higher than that of the coil and having a suitable profile.

However, this device does not remove the error of magnitude.

For remedying this drawback, one uses a phase shifter 18 which makes it possible, according to the invention, to remedy the influence of the spacing of the antennae 3—4 and 5—6 and which determines both an error of phase and an error of magnitude with respect to the ideal "frame" field which gives an angular shifting of the beaconed axis exactly equal to the angle by which the movable coil 21 has rotated.

The phase shifter 18 (Figure 7) is a symmetrical phase shifter with a resistor 26 and a variable condenser 27 supplied by a transformer 25. The middle point of the secondary winding of said transformer 25 is connected with the common point 28 of the resistor 26 and the condenser 27 by a potentiometer having the capacities $C^2$ and $C^3$, one capacitor $C^2$ of which is variable. The common point 29 of both capacities is grounded.

The phase shifter works as follows:

Consider the vectorial voltage diagram (Figure 8).

$\overline{OA}$ and $\overline{OB}$ are the equal voltages of opposed signs between the middle point O of the secondary winding of the transformer 25 and each outlet from said secondary winding.

$\overline{BM}$ and $\overline{MA}$ are respectively the voltages in quadrature across the condenser 27 and across the resistor 26. Supposing that the values of the resistance 26 and of the capacitance of the variable condenser 27 are much smaller than the resulting impedance of the condensers $C^2$ and $C^3$ connected in series, $\overline{OM}$ is the voltage between the middle point of the secondary winding 25 and the point 28 common to the resistor 26 and the condenser 27; $\overline{NM}$ is the voltage between the common point 28 and ground.

Thus, when the capacity of the condenser 27 or the value R of the resistor 26 is varied, only the phase of the voltage $\overline{MN}$ is varied, since point M is shifted on the half-circumference with the centre O, angle AMB remaining equal to 90 degrees.

This makes it possible to adjust the phase of the voltage transmitted to the modulator 14 and, accordingly, the phase of the antenna modulation voltage.

When the ratio $$\frac{C^2}{C^3}$$

is varied, only the magnitude MN is varied which is transmitted to the modulator 14. This makes it possible to adjust the magnitude of the modulation transmitted to the antenna.

For this purpose, the rotors of the variable condenser 27 and of the variable condenser $C^2$ can be mounted on one end and the same driving shaft, for instance the shaft which controls the rotation of the coil 21, the profile of the rotors of both said condensers being such that for a given direction of a beaconed axis one of the condensers, the condenser 27, insures the phase correction, while the other, the condenser $C^2$, insures the correction of magnitude.

It is thus possible to give the modulated antenna field in the course of the rotation of the axis and whatever the azimuth may be an instantaneous magazine equal to the magnitude of the frame modulated field in the azimuth where the frame modulation phase is, at that moment, at 180 degrees from the antenna modulation phase.

Of course, the potentiometer with the capacities $C^2$ and $C^3$ can be substituted by a potentiometer with resistances $R^2$ and $R^3$ connected in the same manner (Figure 9).

It is also possible to have instead of a single coil rotating with one revolution per minute in the field of two rectangular coils a second coil rotating with three R. P. M. in a contrary direction, the ratio of the E. M. F. in both said coils being adjusted to the proper value.

Another improvement shown in Figure 6 consists in feeding the coils 19 and 20 not from 16 and 17 but by means of modulated high frequency voltages applied to the antenna systems 3—4 and 5—6 after a suitable detection of said voltages for separating the modulation frequency. This modification offers the advantage of automatically compensating the errors due to the low frequency phase differences or differences of magnitude between the currents of the antenna systems 3—4 and 5—6, said differences being due to the imperfections of the modulators 9—10 or to those of the various amplifier stages.

Of course, in this modification, a special loud signal is emitted when the beacon axis passes through a fixed predetermined direction (north, for instance) by means of the central antenna. This loud signal indicates in the receiver, as known, the origin of the times for determining the time period elapsing between said passage (through the north) and the passage of the axis through the direction of the receiver, from which period of time said direction is deducted.

(*c*) A modification of the form of execution (*b*) consists in abandoning the use of intermixed signals, in varying $\delta$ in function of the time much more rapidly as, for instance, with a frequency $f^1$ of 25 or 50 c./sec. and in using a frame modulated field markedly different from the modulated field of the central antenna. In these conditions it is easy to see that the magnitude of the detected current with a pulsation $\alpha$ varies in a practically sinusoidal manner at the frequency $f^1$. In the receiver a second detection separates this frequency $f^1$ while supplying a current the phase of which varies with the direction in which the receiving station lies.

This variation of $\delta$ at the frequency $f^1$ is obtained simply by causing the coil 21 of Figure 5 to rotate with the angular velocity of $2\pi f^1$. Whenever said coil passes through a fixed predetermined (moreover variable) position, a very short wavetrain is emitted by the central antenna on the same high frequency. In reception, such wave trains, the magnitude of which is much higher than the magnitudes of the normal signals, are used as phase marks. They are used, for instance, for lighting a neon tube while the current detected at the frequency $f^1$ drives a synchronous motor which actuates a compass-card. Thus, the azimuth of the receiver can be read directly on the compass-card.

If the emission of the antenna systems 3—4 and 5—6 is interrupted during a few moments while the aforesaid wave trains are transmitted and the antenna emission is doubly modulated at the frequencies $$\frac{\alpha}{2\pi}$$

and $f^1$, which can be obtained, for instance, by feeding only one of both coils 19 and 20, the azimuths read on all the compass-cards during these few moments must be identical; this permits to steady all the receiving devices in their correct position by periodically checking their fixing.

The above described device offers of making it possible easily to correct, as mentioned above, the errors due to the influence of the spacing of the antennae 3—4 and 5—6 as well as those which arise from the imperfections of the modulating and amplifying stages.

It is also possible to provide for a direct reading of the bearing of the receiver in the following manner:

The transmission of the low frequency oscillation $f^1$ serving as a phase mark is effected by means of a complementary modulation of the field of the antenna 7 at the frequency $f^1$.

The phase of the antenna modulation at the frequency $f^1$ is identical for all the azimuths. Owing to this fact, it defines a phase origin in the reception which is common to all the azimuths. The equipment (Figure 12) for carrying out the preceding method is similar to the equipment of Figure 5 in which the E. M. F. for the modulation of the antenna at the frequency $f$ is obtained in a coil rotating with $f^1$ revolutions per second, in a field rotating at the frequency $f$, said rotating field being obtained by means of two rectangular coils fed by means of E. M. F.'s of frequency $f$ in quadrature.

The additional modulation of the antenna at the frequency $f^1$ is obtained either by adding to the E. M. F. of frequency $f$ supplied by said rotating coil an E. M. F. of frequency $f^1$ or by partially modulating at the frequency $f^1$ the anode voltage of the antenna power stage 14 or any other means known for this purpose.

To this end, a voltage source 22 of frequency $f^1$ yields the alternating part of the anode voltage of the power stage 15. This source can be quite simply the secondary winding of a transformer connected with a power supply line if the frequency $f^1$ is taken equal to that of the power supply line. The coil 21 rotates at $f^1$ revolutions per second in the field of the coils 19 and 20.

It is obvious that the sum of the modulation rates at the frequencies $f$ and $f^1$ must be lower than 1. On reception, a first detection causes first a voltage of a frequency $f$ and a voltage of a frequency $f^1$ to appear. The separation of both these voltages of very different frequencies is obtained by means of an exceedingly simple filter.

A second detection of the voltage of frequency $f$ causes the voltage of frequency $f^1$ to appear, the phase of which varies with the azimuth.

It is then sufficient to compare the respective phases of both voltages of a frequency $f^1$. This comparison can be made in a phasemeter similar to the commercial apparatus or in any known apparatus for effecting the measurement of a phase difference between two voltages of the same frequency.

Thus, on reception (Figure 13) the antenna 31 supplies the receiver 32. At the outlet of the receiver 32 the filter 33 separates the frequencies $f$ and $f^1$ (the phase of which is independent of the azimuth). These frequencies are amplified by the amplifiers 34 and 35 and then the current of frequency $f$ is detected at 36, which gives a second current of frequency $f^1$ (the phase of which varies with the azimuth). The phases of both currents of frequency $f^1$ are compared in the phasemeter 37.

It is also possible, instead of applying to the antenna field a partial additional modulation at the frequency $f^1$, to emit a field of a high frequency different from the beacon high frequency. This field is modulated at the frequency $f^1$ and the modulation phase is independent of the azimuth.

On reception, a receiving station receives the field modulated at the frequency $f^1$ of variable phase and a second receiving station receives the field modulated at the frequency $f^1$ of fixed phase.

Then the phases of the currents of frequency $f^1$ obtained at the outlet of each of both receivers are compared.

Numerous modifications can be made in the above described radio guidance systems without departing from the scope and spirit of the invention as defined in the appended claims.

It is possible, more particularly, to make a radio guidance system simultaneously defining not one but a plurality of fixed beacon axes, for instance a number $n$ of such axes among which the user selects at every moment the axis which seems proper for him.

For this purpose, $n$ frequencies of modulation are used instead of one, each of which being a characteristic of one of the beacon axes.

In a diagrammatical embodiment shown in Fig. 10 the $n$ modulation frequencies are emitted simultaneously and continuously. The transmitter which is used has a high frequency part which is identical with that of Figure 5 employing the directional antennae 3—4 and 5—6 fed by power stages 11—12 from modulators 9—10, and the central antenna 7 fed by the power stage 15 from modulator 14. The high frequency oscillator 8 supplies the high frequency directly to the modulators 9—10 and through the medium of the dephaser 13, thus establishing the quadrature which is necessary for the modulator 14. The references hereunder correspond to those of said Figure 5.

According to the invention, there are employed $n$ low frequency generators $\mathbf{16_1—16_2—16_3}$ feeding the modulators 9 and 10 in parallel. The modulator 10 is fed directly and the modulator 9 is fed through the medium of phase shifters $\mathbf{17_1—17_2—17_3}$, shifting the phase respectively by a quarter of a cycle for each of the frequencies $f_1$, $f_2$, $f_3$ of the corresponding modulation. For clearness' sake, the figure has been limited to three generators only.

The modulator 14 of the central antenna could be fed by the generators 16 through suitable phase shifters. The high frequency voltages coming from the directional aerials 3—4 and 5—6 or from the power stages 11—12 are detected and the resulting modulating voltages are sent through two fixed coils 19—20 so as to provide fields rotating at the different modulation frequencies. Said fields induce in fixed suitably shifted coils $\mathbf{21_1—21_2—21_3}$, the number of which is equal to that of the generators 16, alternating voltages which serve, after their passage through suitable filters $\mathbf{22_1—22_2—22_3}$, to feed the modulator 14 of the central antenna.

Owing to the presence of the filters the apparatus functions as if each coil 21 were submitted only to the rotating field corresponding to the modulation frequency which the associated filter allows to pass. There is thus obtained self-correction of the phase or magnitude differences due to the imperfections of the modulators.

It is to be noted that the coils 21 are fixed here while this arrangement served previously to provide a rotating axis.

Figure 11 shows another embodiment of this invention in which the $n$ modulation frequencies are emitted successively one by one by means of a suitable change over switch or commutator, for instance an electronic distributor. Said distributor sends, therefore, the modulation $f^1$ during a time $$\frac{1}{n}$$

towards the modulators 9—10 and (preferably through the medium of coils 19—20—21 as in the above mentioned filter 1) towards the modulator 14, then the modulation $f^2$ and so on.

In this arrangement there are also employed $n$ coils 21 which are also connected up successively by the commutator. In this form of the invention the filters 22 are, of course, unnecessary since there is only a rotating field at a given moment. The construction of the necessary commutators or electronic distributors is well known in the art.

The electronic distributor can consist of a unit formed of screen grid tubes for each change of connection to be effected. The control grids of these tubes are connected with the different lines the connections of which are to be changed. The plate-circuits of these tubes are connected in parallel to the common connection while their screen-grids are biased successively by alternating voltages of a suitable frequency shifted with respect to one another by a fraction of a cycle so that one of the tubes and only one is working at a predetermined moment of this period.

As many tubes as there are generators 16 are employed. For the example of Figure 11 which comprises three generators 16 there will be, therefore, three groups of three tubes, the screen-grids of the corresponding tubes of each group being preferably fed in parallel.

The appreciation of the minimum value of the modulation rate (criterion of the beacon axis) is effected by a manipulation, at the cadence of intermixed signals, causing, for instance, a variation of the phase in the modulation of the field of the central antenna.

The reception offers nothing new in the case where the modulation frequencies are emitted simultaneously and continuously; it is sufficient to provide a low frequency amplifier provided with a filter making it possible to select the desired frequency. In the case where said frequencies are emitted successively the frequency which it is desired to receive is also selected as above; there is then observed a current of a value I during a fraction $$\frac{1}{n}$$

of the cycle and then of a value C during the remainder of the cycle. The cadence of the frequency change-over being for the frequency $n$ much higher than that of the modulation one has a current $i_1$ during the dashes and $i_2$ during the dots. Said values $i_1$ and $i_2$ can be compared by any suitable method; for instance, these currents can be rectified to obtain direct currents which are fed to a differential galvanometer, or these currents may be separated according to their frequencies which are compared by hearing. This latter procedure requires the use of an audible frequency $n$ which entails high values for the different modulation frequencies.

I claim:

1. A method of transmitting radio beacon signals comprising the steps of energizing a pair of directional antenna systems in accordance with high-frequency oscillations, modulating said high-frequency oscillations in accordance with a low-frequency, shifting the phase of the low-frequency modulating the high-frequency oscillations supplied to one of said antenna systems by a fixed amount, energizing an omni-directional antenna with said high-frequency oscillations, shifting the phase of the high-frequency oscillations fed to said omni-directional antenna by substantially a quarter of a cycle, producing a rotating magnetic field from said low-frequency oscillations, producing a low-frequency voltage from said rotating magnetic field and modulating said high-frequency oscillations supplied to said omni-directional antenna in accordance with said last mentioned low-frequency voltage so that the resulting field radiated by said directional antenna systems and said omni-directional antenna is modulated in accordance with said low-frequency to different degrees varying with the direction of transmission of the radio beacon signals and reaching a maximum in the directions where the low-frequency modulations of the fields of both said directional antenna systems and said omni-directional antenna are in phase and reaching a minimum in the directions where they are in opposition.

2. A method of transmitting radio beacon signals comprising the steps of energizing a pair of directional antenna systems in accordance with high-frequency oscillations, modulating said high-frequency oscillations in accordance with a low-frequency, shifting the phase of the low-frequency modulating the high-frequency oscillations supplied to one of said antenna systems by a fixed amount, energizing an omni-directional antenna with said high-frequency oscillations, shifting the phase of the high-frequency oscillations fed to said omni-directional antenna by substantially a quarter of a cycle, producing a rotating field from said low-frequency oscillations, producing a low-frequency voltage from said rotating field, periodically shifting the phase of said low-frequency voltage, and modulating said high-frequency oscillations supplied to said omni-directional antenna in accordance with said last mentioned low-frequency voltage so that the resulting field radiated by said directional antenna systems and said omni-directional antenna is modulated in accordance with said low-frequency to different degrees varying with the direction of transmission of the radio beacon signals and reaching a maximum in the directions where the low-frequency modulations of the fields of both said directional antenna systems and said omni-directional antenna are in phase and reaching a minimum in the directions where they are in opposition.

3. A method of transmitting radio beacon signals comprising the steps of energizing a pair of directional antenna systems in accordance with high-frequency oscillations, modulating said high-frequency oscillations in accordance with a low-frequency, shifting the phase of the low-frequency modulating the high-frequency oscillations supplied to one of said antenna systems by a fixed amount, energizing an omni-directional antenna with said high-frequency oscillations, shifting the phase of the high-frequency oscillations fed to said omni-directional antenna by substantially a quarter of a cycle, producing a rotating field from said low-frequency oscillations, producing a low frequency voltage from said rotating field, periodically shifting the phase of said low-frequency voltage, periodically varying the magnitude of said low-frequency voltage, and modulating said high-frequency oscillations supplied to said omni-directional antenna in accordance with said last mentioned low-frequency voltage so that the resulting field radiated by said directional antenna systems and said omni-directional antenna is modulated in accordance with said low-frequency to different degrees varying with the direction of transmission of the radio beacon signals and reaching a maximum in the directions where the low-frequency modulations of the fields of both said directional antenna systems and said omni-directional antenna are in phase and reaching a minimum in the directions where they are in opposition.

4. A radio beacon apparatus comprising a pair of directional antenna systems, said directional antenna systems being positioned to radiate signals in different directions, a high-frequency oscillator coupled to said antenna systems, a low-frequency oscillator, means for modulating the high-frequency oscillations radiated by said antenna systems in accordance with the low-frequency oscillations generated by said low-frequency oscillator, means for shifting the phase of the low-frequency oscillations modulating the output of one of said antenna systems with respect to the phase of the low-frequency oscillations modulating the output of the other of said antenna systems, an omni-directional antenna, means for coupling said high-frequency oscillator to said omni-directional antenna, means for shifting the phase of the high-frequency oscillations supplied to said omni-directional antenna by substantially a quarter cycle of said high-frequency, means for modulating the high-frequency oscillations supplied to said omni-directional antenna in accordance with said low-frequency oscillations, said last mentioned means including a pair of coils connected to said low-frequency oscillator to be energized therefrom, the phase of the current through one of said coils being shifted by said first mentioned phase shifter, said coils being disposed with respect to each other to produce a rotating magnetic field, and a moveable pickup coil disposed in said rotating magnetic field to receive a low-frequency voltage for modulating said omni-directional antenna, the resulting field radiated by said directional antenna systems and said omni-directional antenna being modulated in accordance with said low-frequency to different degrees varying with the direction of transmission of the radio beacon signals and reaching a maximum in the directions where the low-frequency modulations of the fields of both said directional antenna systems and said omni-directional antenna are in phase and reaching a minimum in the directions where they are in opposition.

5. A radio beacon apparatus comprising a pair of directional antenna systems, a high-frequency oscillator coupled to said antenna systems, a low-frequency oscillation generating means, means for modulating the high-frequency oscillations radiated by said antenna systems in accordance with said low-frequency oscillations, means for shifting the phase of the low-frequency oscillations modulating the output of one of said antenna systems, an omni-directional antenna, means for energizing said omni-directional antenna from said high-frequency oscillator, means for shifting the phase of the high-frequency oscillations supplied to said omni-directional antenna, a pair of coils angularly disposed with respect to each other, means for energizing said pair of coils with low-frequency currents bearing a predetermined relation to the frequency of said low-frequency oscillations and being displaced in phase to produce a rotating magnetic field, a moveable pick-up coil disposed in said rotating magnetic field to produce a low-frequency voltage, and means for periodically shifting the phase of said last mentioned low-frequency voltage, and means for modulating the high-frequency oscillations supplied to said omni-directional antenna in accordance with said last mentioned low-frequency voltage.

6. A radio beacon apparatus comprising a pair of directional antenna systems, a high-frequency oscillator coupled to said antenna systems, a low-frequency oscillation generating means, means for modulating the high-frequency oscillations radiated by said antenna systems in accordance with said low-frequency oscillations, means for shifting the phase of the low-frequency oscillations modulating the output of one of said antenna systems, an omni-directional antenna, means for energizing said omni-directional antenna from said high-frequency oscillator, means for shifting the phase of the high-frequency oscillations supplied to said omni-directional antenna, a pair of coils angularly disposed with respect to each other, means for energizing said pair of coils with low-frequency currents bearing a predetermined relation to the frequency of said low-frequency oscillations and being displaced in phase to produce a rotating magnetic field, a moveable pickup coil disposed in said rotating magnetic field to produce a low-frequency voltage, and means for periodically shifting the phase of said last mentioned low-frequency voltage, means operated in synchronism with said last mentioned means for varying the amplitude of said last mentioned voltage, and means for modulating the high-frequency oscillations supplied to said omni-directional antenna in accordance with said last mentioned low-frequency voltage.

7. Radio beacon apparatus as set forth in claim 5 wherein the means for energizing said pair of coils comprises detectors connected to the circuits of each of said directional antenna systems connected to supply rectified current to said coils respectively from circuits coupled to the respective directional antenna systems.

8. A radio beacon apparatus as set forth in claim 5 further comprising amplifiers connected to said directional antenna systems, and detectors connected to receive some of the outputs of each of said amplifiers, said detectors being included in the means for energizing said pair of coils, one of said detectors being connected to energize one of said coils from the output of one of said amplifiers and the other of said detectors being connected to energize the other of said coils from the output of the other of said amplifiers.

9. A method of transmitting radio beacon signals for defining a plurality of beacon axes in different directions comprising the steps of energizing a pair of directional antenna systems in accordance with high-frequency oscillations, modulating said high-frequency oscillations in accordance with a plurality of low-frequencies, the number of said low-frequencies bearing a predetermined relation to the number of beacon axes, shifting the phase of each of said low-frequencies modulating the high-frequency oscillations supplied to one of said antenna systems by fixed amounts, energizing an omni-directional antenna with said high-frequency oscillations, shifting the phase of the high-frequency oscillations fed to said omni-directional antenna, detecting part of the modulated high-frequency oscillations supplied to said directional antenna systems, producing a rotating field from the detected currents, producing a plurality of low-frequency voltages of predetermined phase relationships from said rotating field, and modulating the high-frequency oscillations supplied to said omni-directional antenna in accordance with said last mentioned voltages.

JOSEPH AICARDI.

REFERENCES CITED

The following references are of record in the file of this patent:

UNITED STATES PATENTS

| Number | Name | Date |
|---|---|---|
| 1,815,246 | Englund | July 21, 1931 |
| 1,933,248 | Evans | Oct. 31, 1933 |
| 1,988,006 | Greig | Jan. 15, 1935 |
| 2,241,918 | Muller | May 13, 1941 |
| 2,253,958 | Luck | Aug. 26, 1941 |
| 2,368,318 | Muller | Jan. 30, 1945 |
| 2,377,902 | Relson | June 12, 1945 |